Nov. 18, 1958     M. R. HATCH     2,860,571
LAMINATED PRESS
Filed Aug. 1, 1955     8 Sheets-Sheet 1
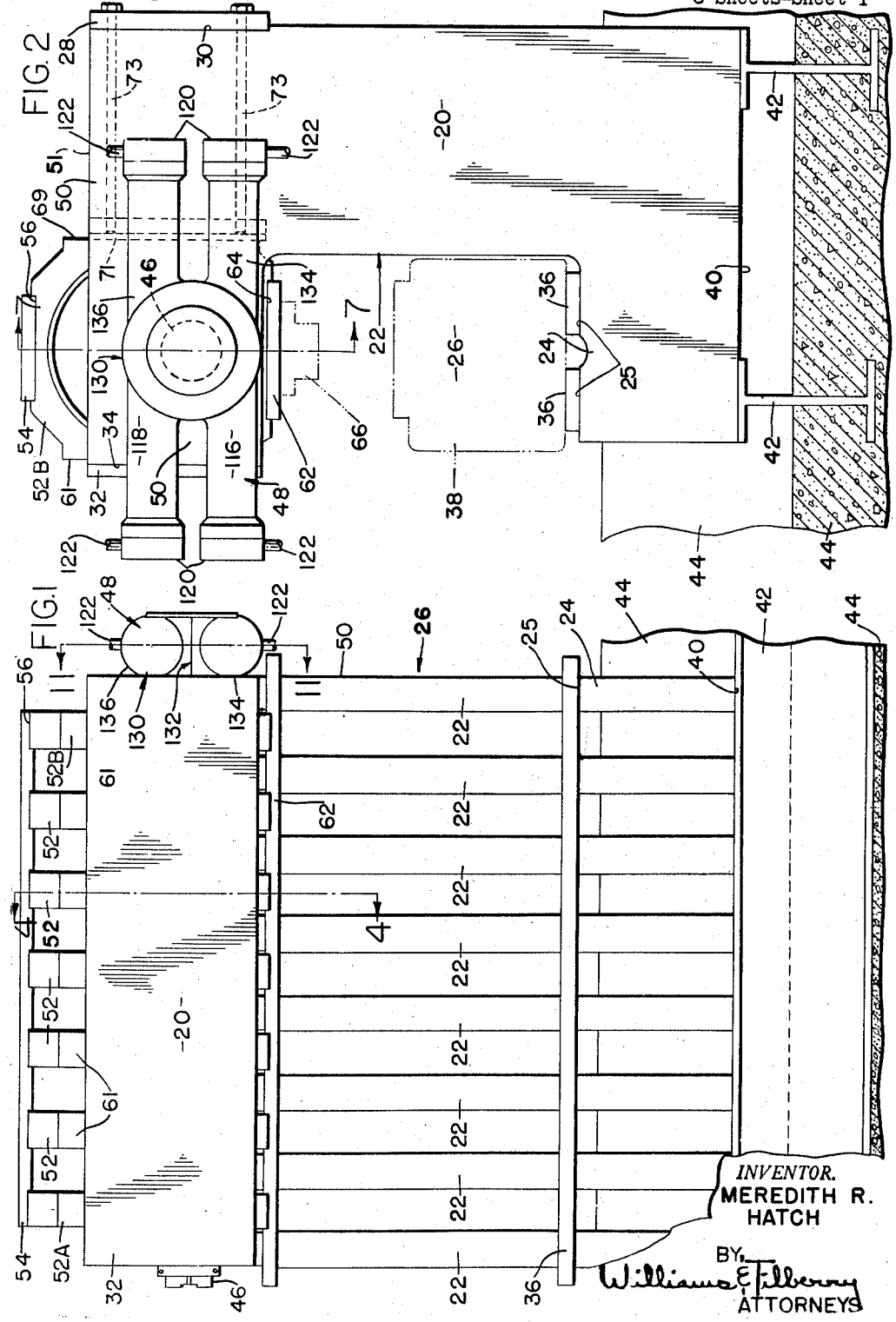
INVENTOR.
MEREDITH R. HATCH
BY
Williams & Tilberry
ATTORNEYS

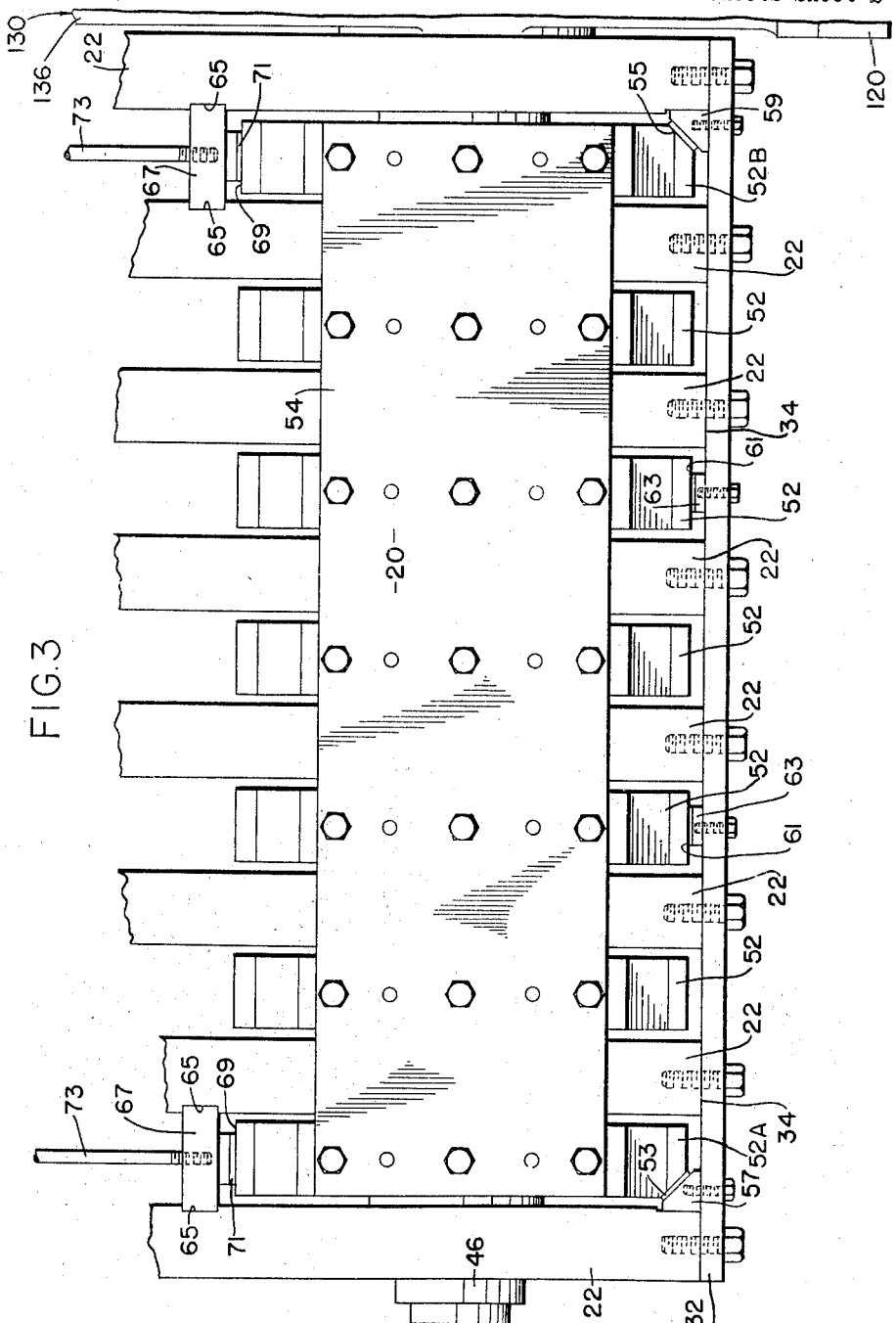

Nov. 18, 1958  M. R. HATCH  2,860,571
LAMINATED PRESS

Filed Aug. 1, 1955  8 Sheets-Sheet 3

*INVENTOR.*
MEREDITH R. HATCH
BY
Williams & Tilberry
ATTORNEYS

Nov. 18, 1958
M. R. HATCH
2,860,571
LAMINATED PRESS
Filed Aug. 1, 1955
8 Sheets-Sheet 4
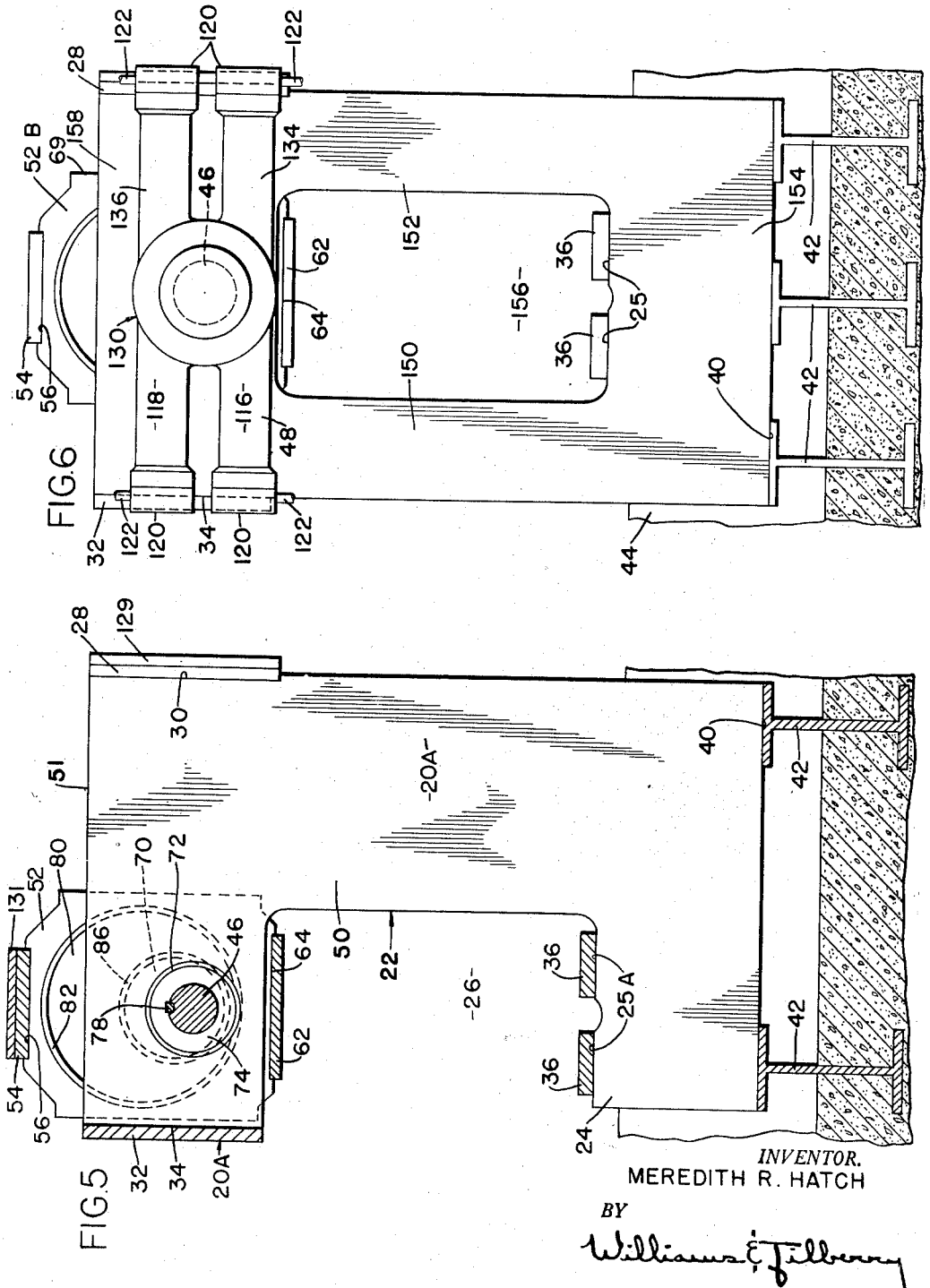
INVENTOR.
MEREDITH R. HATCH
BY
Williams & Tilberry
ATTORNEYS Nov. 18, 1958 M. R. HATCH 2,860,571
LAMINATED PRESS
Filed Aug. 1, 1955 8 Sheets-Sheet 5
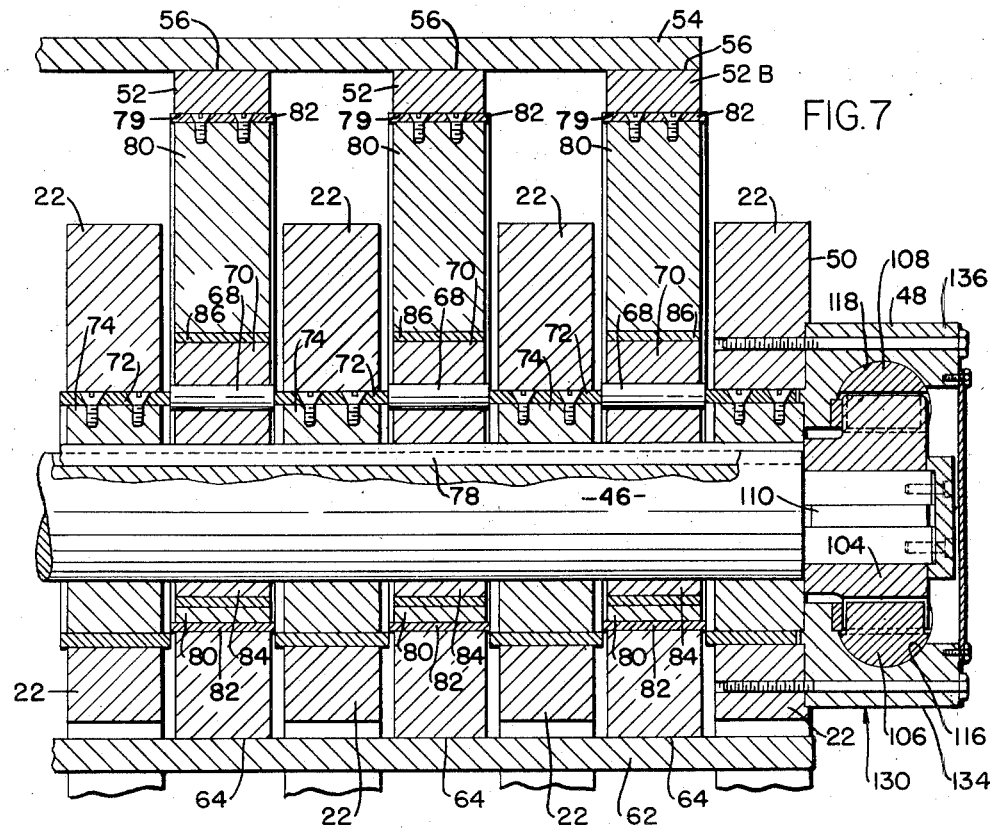
FIG. 7
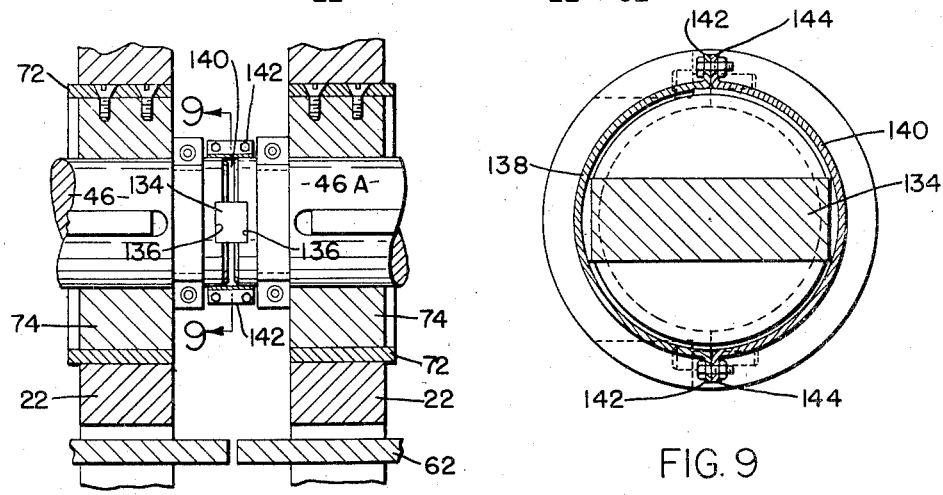
FIG. 8
FIG. 9
*INVENTOR.*
MEREDITH R. HATCH
BY
ATTORNEYS

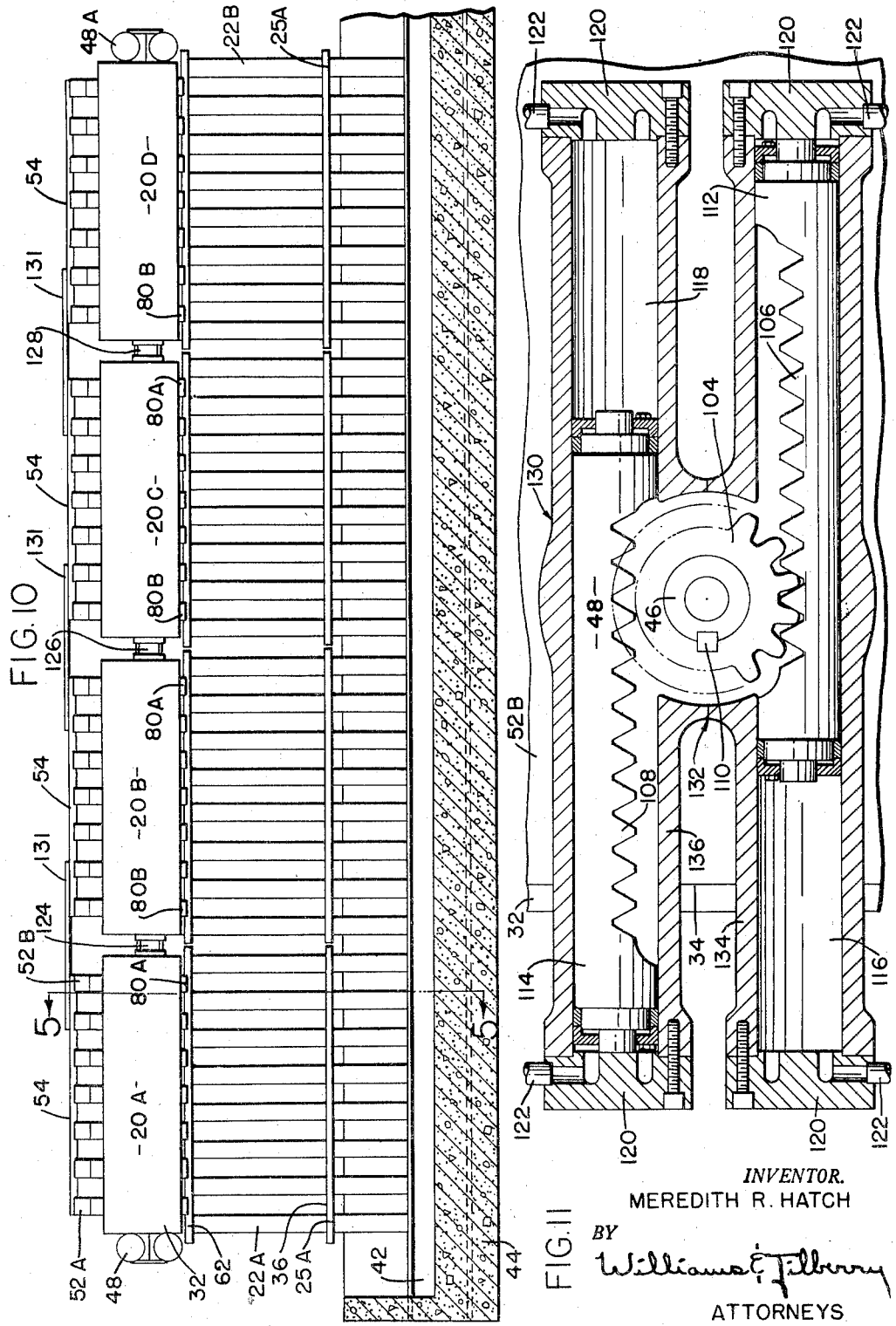

*INVENTOR.*
MEREDITH R. HATCH

Nov. 18, 1958 M. R. HATCH 2,860,571
LAMINATED PRESS
Filed Aug. 1, 1955 8 Sheets-Sheet 8

*INVENTOR.*
MEREDITH R. HATCH
BY
ATTORNEYS

United States Patent Office 2,860,571
Patented Nov. 18, 1958

2,860,571

LAMINATED PRESS

Meredith R. Hatch, Toledo, Ohio, assignor to E. W. Bliss Company, Canton, Ohio, a corporation of Delaware Application August 1, 1955, Serial No. 525,526

7 Claims. (Cl. 100—231)

This invention relates to industrial presses, and more particularly to presses having adaptability for use in a wide variety of pressing operations.

Heretofore, metal working presses and the like have been designed for, and more or less limited to, specific types of work. In particular, the size of the die bed of a press has been a critical factor in the overall design of the press, and the size and shape of the side members, slides, crown, base, overall height, pit requirement, etc., are influenced by the specified dimensions of the die bed. Generally speaking, the greater the area of usable die bed space required for a given job, the larger the associated parts of the press must be. For economy of operation, then, a press is not normally designed to have a capacity much in excess of its intended use. In view of the fact, therefore, that the larger industrial presses are in varying degrees tailor made to customer specification, the cost of these presses is considerably in excess of their cost if they could be mass produced. Unfortunately, the demand for the larger presses of any given size press is usually not sufficiently great to justify their mass production. Consequently, the operation of a press room requires a considerable capital expenditure, which precludes the use of certain types of larger presses to the smaller manufacturers. Furthermore, the cost of press manufacture heretofore has precluded the use of such equipment in small shops, and in isolated or undeveloped areas of the world.

In view of the foregoing, it is an object of the invention to provide an industrial press which is inexpensive to manufacture, lends itself to manufacture by mass production techniques, and is exceedingly flexible with respect to the various types of work which the press can perform. Other objects of the invention include the provision of a laminated type press in which the frame is comprised of a plurality of one piece frame members aligned side by side in a laminated-like manner, and having identical configurations to provide a die bed and die space; the provision of a press having a laminated plunger comprised of a plurality of flat, one piece plunger members adapted to slide between alternate frame members in a laminated-like fashion; the provision of a press requiring a minimum of head space and sub floor space; the provision of a press having novel space-saving co-planar eccentric drive means; the provision of a laminated press, the die bed of which may be increased or decreased at will; the provision of a press comprising a basic unit which can be coupled to any number of similar basic units to provide a segmental press of variable size, and having a plurality of slides operable in combination or separately; and the provision of a press having fluid power cylinder drive means requiring but a minimum of space and parts.

The features of this invention which are believed to be novel are set forth with particularity in the appended claims. The invention itself, however, both as to its organization and use, together with further objects and advantages thereof, may best be understood by reference to the following description taken in connection with the accompanying drawings in which:

Figure 1 is a front elevational view of a preferred embodiment of the invention showing the front edge portions of frame members aligned side by side and spaced apart to receive slide members between each pair of frame members in a laminated manner.

Figure 2 is a side elevational view of the preferred embodiment of the invention shown in Figure 1, and showing in more detail the rack and pinion means employed to oscillate the press drive shaft.

Figure 3 is a top plan view of the press shown in Figure 1, showing the gib means employed to align the press slide members.

Figure 5 is an elevational section of a preferred embodiment of the invention taken through the line 5—5 of Figure 10, to show in one view a frame member, a slide member, associated eccentric drive means, and frame member connecting plates.

Figure 6 is an elevational view of a modified frame member used in conjunction with the invention.

Figure 7 is a fragmentary sectional view taken on the line 7—7 of Figure 2 and showing more clearly the relationship between the frame members, the slide members, the eccentric drive members, and the rack and pinion drive means.

Figure 8 is a fragmentary sectional view of the means employed to couple aligned drive shafts of the laminated press units of Figure 1 to form a segmental press such as shown in Figure 10.

Figure 9 is a sectional view taken on the line 9—9 of Figure 8 to further illustrate the coupling means employed to connect aligned drive shafts.

Figure 10 is a front elevational view of another embodiment of the invention showing a plurality of laminated press units similar to that shown in Figure 1, having drive shafts aligned and coupled by the means shown in Figures 8 and 9 to form a segmental press.

Figure 11 is a sectional view of the rack and pinion press drive means taken on the line 11—11 of Figure 1, and Figures 12 through 23 are sequential diagrammatic representations of the co-planar eccentric drive means at 30° intervals from top dead center to bottom dead center of the stroke of the slide.

Figure 4:
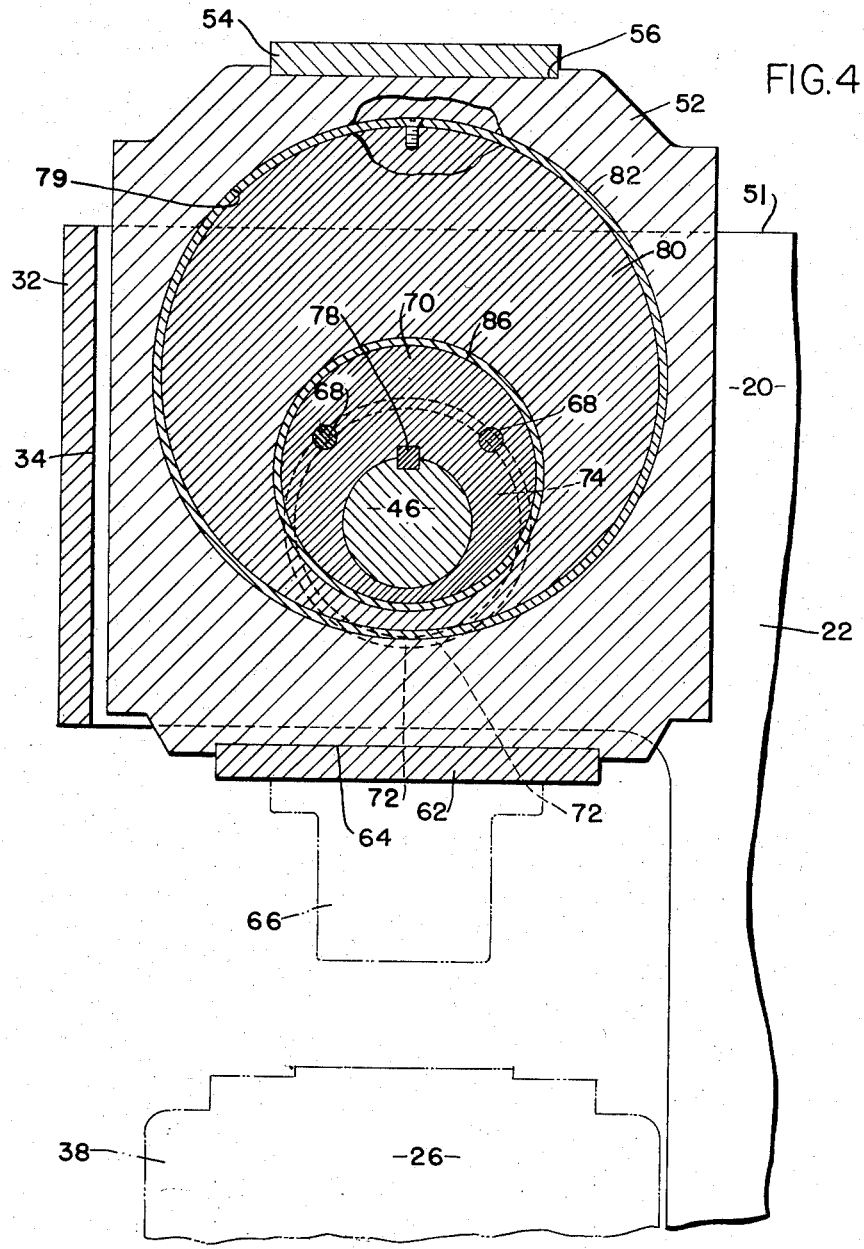
Figure 4 is a sectional view, taken on the line 4—4 of Figure 1, more clearly showing a slide member and the co-planar eccentric drive means fitted within the slide member.
Figure 12:
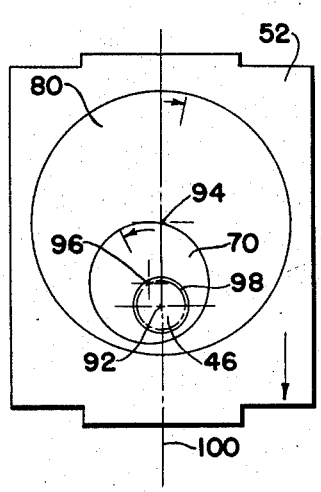
Figure 13:
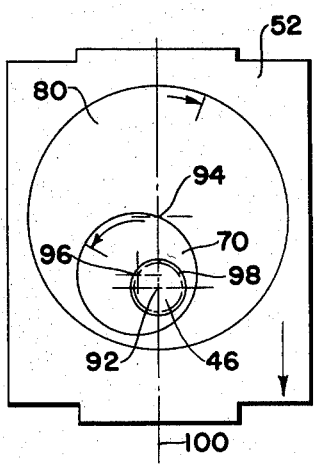

Referring now to the drawings in greater detail, and in particular to Figures 1 and 2, a preferred embodiment of the invention comprises what will hereinafter be referred to as a laminated press 20, having a plurality of one-piece frame members 22 aligned side by side and spaced apart one member from another an equal distance. These frame members are monolithic in character, i. e., they are formed from one-piece slabs, preferably steel and, in the illustrated embodiments of the invention, these slabs of steel are in the neighborhood of six inches thick to provide structural rigidity within each frame member. The press 20 shown in Figure 1 is a gap type press, and the die bed 24 and die space 26 of the press are formed by cutting or otherwise removing like portions from each frame member so that, when the frame members are aligned, the spaces in each frame will complement each other to provide a suitable die space. Material from each frame member is most economically removed by cutting torch means, whereinafter surfaces, such as at 25, may be machine finished.

The frame member 22 is a basic unit in the press in that the width of the die bed is determined by the number of frame members which are provided, so that the die bed can be made any size desired by adding or subtracting frame member elements from the press. A group of frame members selected to comprise a given size press are held together by means of a back plate 28 bolted, or otherwise fastened to the back surfaces 30 of each frame member; a front or crown plate 32 rigidly secured to the front faces 34 of the frame members; and a pair of bolster plates 36 which are secured to the machine surfaces 25 of the die bed portion 24 of the frame members for carrying thereon all suitable dies or die cushions 38. The bottom surfaces 40 of the frame members 22 rest on a pair of I-beams 42 embedded in a concrete base 44 provided beneath the press. A drive shaft 46 extending the width of the press is suitably journaled in each frame member 22 and is adapted to be driven by drive means 48 mounted on the side 50 of one of the outboard frame members 22 of the press. If the press comprises a large number of frame members, an identical drive unit 48 may be mounted on the opposite outboard frame member of the press so that the drive shaft may be powered from both ends.

The slide of this press comprises a plurality of one-piece slide members 52 prepared from the same type of stock as that of the frame members, i. e., six inch steel slabs. The frame members 22 are spaced apart substantially the thickness of the slide members 52 plus a minimum space required for movement of the slide members between adjacent frame members. It is this relationship between alternate frame and side members which makes the press laminated in structure. The slide members 52 are adapted to move in unison and to this end are secured together by means of a top plate 54, bolted or otherwise connected to the top surface 56 of each slide, and a die support plate 62 fastened to the bottom surfaces 64 of each slide member 52. An upper die 66 is mounted on the lower side of the die support plate 62 by threaded fasteners.

The slides 52 are aligned between adjacent frame members 22 by means of spacer rods 68 (see Figures 4 and 7) secured in inner eccentric discs 70 and adapted to slidably bear against the edges of spacer rings or bushings 72 fastened to the peripheries of drive shaft journal discs 74. The journal discs 74 are key fastened to the drive shaft 46 at 78 and are spaced apart to be rotatably received each within a frame member 22. The spacer rings 72 and journal discs 74 are concentric with the drive shaft 46 so as to provide bearing contact with the spacer rods 68 throughout the movement of the slides 52. The slide members 52 comprise substantially rectangular slabs having circular openings 79 (Figure 4) formed therethrough to slidably receive therein circular discs 80, which are bushed with suitable bearing metal inserts or sleeves 82. These circular discs 80 are vertically co-planar with inner discs 70 slidably fitted within the larger discs 80 and eccentric therewith. Bushings 86 are secured to the inner discs 70 holding the inner and outer discs 70 and 80 concentrically apart to prevent metal to metal wearing contact therebetween and to provide good sliding contact between the pairs of inner and outer discs.

The outboard slide members 52A and 52B (see Figure 3) are mitered at 53 and 55 respectively to slidably bear against mitered gibs 57 and 59 which are bolted to front plate 32. Thereafter, alternate inboard slide members 52 are brought to slidably bear on their front surface areas 61 against plain gibs 63 which are also bolted to front plate 32. Opposed vertical grooves 65 are machined in the outboard pairs of frame members 22 to receive therein back gibs 67 which are adapted to make proper sliding contact with the back surfaces 69 of slide members 52A and 52B by shim means 71. Back gibs 67 are held in place by elongated tie bolts 73 fastened to the back tie plate 28 (Figure 2), and are quickly removable by unthreading the bolts 73 from the back gibs 67, whereinafter the back gibs are slidable upwardly until free of the retaining grooves 65.

Figure 14:
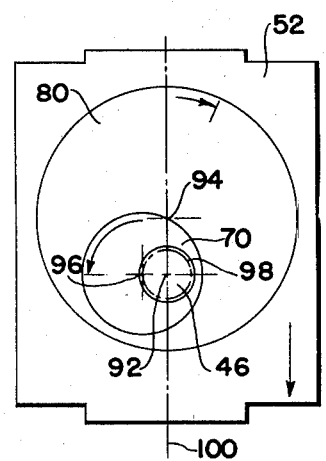
Figure 15:
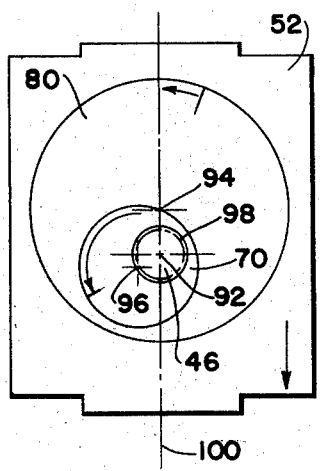
Figure 16:
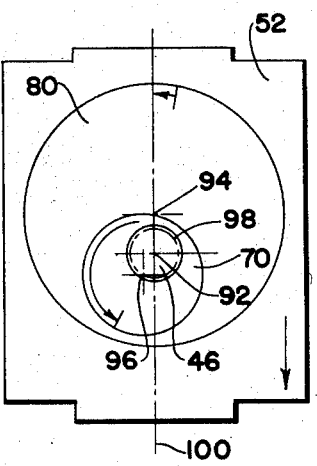
Figure 17:
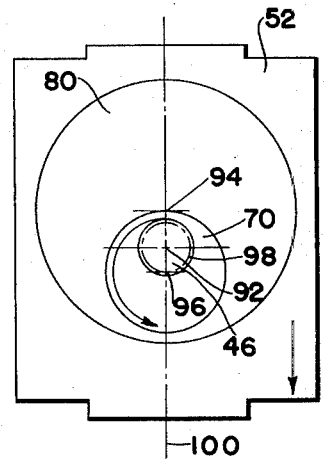
Figure 18:
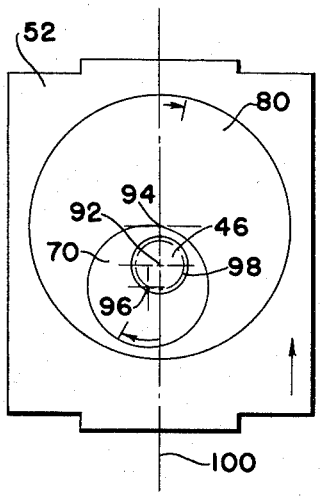
Figure 19:
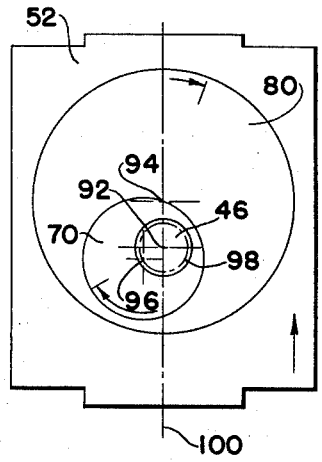
Figure 20:
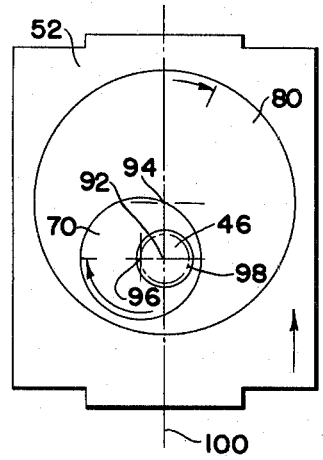
Figure 21:
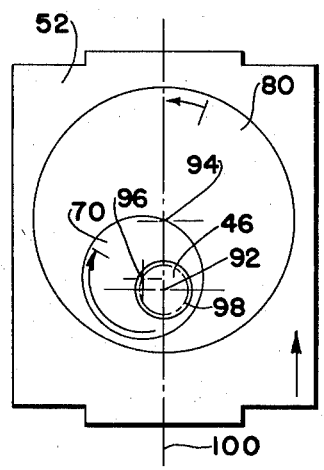
Figure 22:
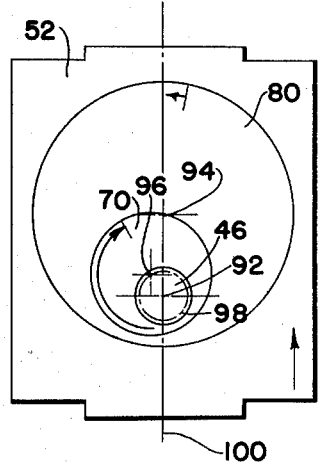
Figure 23:
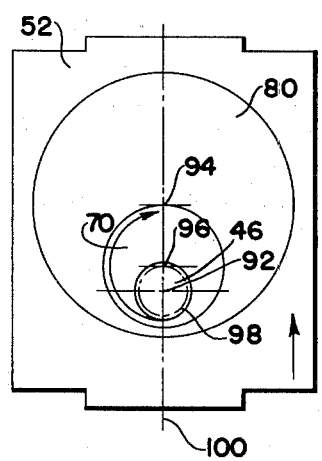

It will be observed that the eccentricities of the two circular discs 70 and 80 are, as shown in Figure 4, on the top side of the drive shaft 46 in the top dead center position. Assuming the drive shaft to rotate in a counter-clockwise direction, the relative positions of the drive shaft 46, inner disc 70, and outer disc 80 are consecutively shown in Figures 12 through 23 for every 30° of drive shaft rotation. As the inner disc 70 rotates counter-clockwise or to the left about the center 92 of the drive shaft 46, the outer disc 80 is driven by the inner disc rotatably clockwise about its own center 94. The center 96 of the inner disc 70 moves in the fixed orbit 98 about drive shaft center 92 while the center 94 moves vertically along the axis 100 of the slide 52. The relative positions of the inner and outer co-planar discs 70 and 80, after the drive shaft 46 has rotated 90°, are shown in Figure 14, where it will be seen that inner disc 70 has rotated 90° counter-clockwise about drive shaft center 92 while outer disc 80 has rotated clockwise approximately 25° about its own center 94. After the drive shaft 46 has rotated 90° from top dead center, continued counter-clockwise rotation of inner disc 70 reverses the rotational direction of outer disc 80 so that between 90° and 180° of crankshaft rotation (see Figures 14 through 17) both the inner and outer discs are rotating counter-clockwise. When the drive shaft 46 reaches the 180° or bottom dead center position, the inner disc has rotated to bottom dead center and the outer disc has returned to top dead center. At bottom dead center the drive shaft 46 is adapted to be stopped for any predetermined period of time, whereinafter its previous rotational direction is reversed and it rotates clockwise to top dead center, thereby completing a cycle of operation. The movements of the inner and outer discs are just the reverse of their movements during the first half of the cycle, as shown in Figures 18 through 23, so that both discs are once again at top dead center when the drive shaft is returned 180° from bottom dead center to top dead center. It will be noted that throughout the complete cycle of operation, the center 96 of the inner disc 70 moves in an orbit within the confines of the outer disc 80.

Press drive means 48 (see Figure 11), comprising a drive gear 104 and a pair of diametrically opposed racks 106 and 108, are adapted to impart a 180° rotational turn to the drive shaft 46, whereinafter the direction of movement of each rack is reversed to impart an opposite 180° rotational turn to the drive shaft. When exceptionally heavy workloads are anticipated, duplicate drive means may be mounted on the opposite ends of the drive shaft 46 to increase the driveshaft torque input. The gear 104 is suitably secured, such as by key means 110, to one end of the drive shaft. Racks 106 and 108 comprise portions of pistons 112 and 114 respectively which are slidably housed in cylinders 116 and 118. Cylinders 116 and 118 are two-way in operation and are adapted to receive fluid pressure through opposite ends 120 by means of suitable hose connections 122. The action of the cylinders are synchronized so as to force the pistons 112 and 114 simultaneously in opposite directions to impart a 190° rotational movement to the gear 104 and to the drive shaft 46. Rotation of the drive shaft carries the press slide members from top dead center to bottom dead center during which time a suitable press operation is performed. Thereafter, by valve means, not shown, the pressures in the cylinders 116 and 118 are reversed to return the pistons 112 and 114 to their initial positions. The housing 130 for the drive means 48 is split at 132 to provide housing halves 134 and 136, wherein either half may be removed if the power furnished by one cylinder is sufficient for particular press tonnage requirements. Since this drive means is mounted on the side 50 of an outboard frame member 22 beneath the top edge 51 of the frame member, the press is substantially without a crown, enabling it to be utilized in areas having a minimum of head room. Furthermore, since the pressure in the cylinders must be reversed before the slide is returned from the bottom dead center to the top dead center position, a dwell period of any desired length can be obtained, or the slides can be returned from bottom dead center without any dwell period whatsoever.

The adaptability of the invention is illustrated in Figures 5 and 10, wherein is shown a series of laminated press units 20A, 20B, 20C and 20D connected together to form what is referred to hereinafter as a segmental press. The respective drive shafts of the laminated press units are in axial alignment and are coupled together at 124, 126, and 128 to provide a press having an exceptionally long die bed 25A. The press units are inter-connected by means of plates 129 (Figure 5) which overlap and are bolted to plates 28, and by overlapping top plates 131 which are bolted to top plates 54. The particular press shown in Figure 10 employs a segmental die bed approximately 40 feet in length, but it is not limited to a bed of this size since it will be readily apparent that any number of basic laminated press units may be added or subtracted to provide a die bed of any desired length. Because of the relatively narrow thickness of the outboard frame members 22 of the laminated press units with respect to their depth and height, it is possible to place the basic laminated press units sufficiently close together that the die bed 25A, of the segmental press, is, for all practical purposes, one continuous unit. In like manner, the inboard slide members 80A and 80B of adjacent press units are sufficiently close together to provide a uniform pressure on an upper die as it engages a workpiece supported on a lower die (not shown).

A further advantage of the combined press shown in Figure 10 resides in its adaptability to various types of work. With the drive units 48 and 48A secured to the outboard frame members 22A and 22B of the outer press units 20A and 20D respectively, it is possible to selectively couple consecutive drive shafts in any predetermined order. For instance, the press unit 20A on the left can be synchronized to operate in any timed relationship with the press units to the right by uncoupling the drive shafts at 124. Furthermore, depending on the job requirements, it is conceivable that operation of the outer press units 20A and 20D only may be advantageous, and for smaller jobs it is possible to disengage a single outer press unit 20A or 20D for separate operation. The economy in operating just the right number of press units for the size of the job will be readily apparent, so that the right size press will always be available for the particular job requirement. Although the press units 20A, 20B, 20C, and 20D are shown to be of the same size, it is contemplated that the experience of a manufacturer will indicate what combination of various size basic laminated press units 20 will be particularly advantageous for his type of operation. In which case, each press unit might conceivably be a multiple of a subsequent or adjacent unit with respect to number of laminated frame and slide members. With such flexibility, any size die bed is available for use at any time.

Although as shown the invention is in the nature of a single action press, with suitable die cushions the basic laminated press units may be converted into double or even triple action presses. Nor is the operation of the press restricted to an over-driven means, as shown, since it is equally adaptable for operation with the drive shaft 46 journaled in the frame members 22 beneath the bed 25 of the press, inasmuch as the frame members are substantially symmetrical about a horizontal axis equidistant from the top and bottom of the press. It will be seen, therefore, that practically every combination of press movements may be provided in this basic laminated press unit, including underdrive, overdrive, and multiple press actions employing dies in combination with the press slide and die cushions.

The means for coupling basic units together are shown in Figures 8 and 9, and comprise a key 134 adapted to fit in opposed key slots 136 of the ends of axially aligned drive shafts 46 and 46A, the key being retained in these key slots by means of a pair of half round straps 138 and 140 bolted together through radially projecting flanges 142 and 144.

A modified form of the press frame member is shown in Figure 6, and is particularly suited for press requirements requiring greater strength in the press frame members. To provide greater frame strength, side members 150 and 152 are provided by removing a rectangular portion of stock from the basic slab of steel in the central body portion of the slab. This leaves a base portion 154, a center die space opening 156, the aforesaid side portions 150 and 152, and a top drive shaft supporting portion 158. In the case of the gap-type press, shown in Figure 5, the frame member is C-shaped and the strength of the frame 22 depends on the relative depth of the single side portion 50. With the gap-type press, the basic press units are suitable to be placed side by side, whereas with the embodiment shown in Figure 6, the units may be more suitably referred to as being placed in tandem or in front to back relationship.

It is to be understood that the embodiments of the invention shown herein are by way of example only and are not to be construed in a limiting sense. Other arrangements and modifications will occur to those skilled in the art and may be resorted to without departing from the scope of the invention.

I claim:

1. The improvement in industrial presses comprising: a plurality of frame members aligned side by side and laterally spaced apart one from another; a drive shaft extending through and journaled in said frame members; a plurality of slide members having circular openings in their body portions and adapted to reciprocate between adjacent frame members; first co-planar circular discs adapted to slidably fit within said slide member circular openings, said discs also having circular openings eccentric to their axes; second co-planar circular discs eccentrically mounted on said drive shaft and adapted to slidably fit within the circular openings in said first circular discs, whereby rotation of said drive shaft will cause said slide members to reciprocate between adjacent frame members.

2. A press comprising a plurality of one-piece frame members spaced apart one from another; a plurality of one-piece slide members, each adapted to reciprocate between pairs of frame members, said frame members being spaced apart one from another a distance substantially equal to the thickness of said slide members; a drive shaft journaled in said frame members; eccentric means co-planar with said slide members and drivingly connecting said drive shaft to said slide members; a drive gear rigidly secured to one end of said drive shaft; rack means mounted on the press below the top of the adjacent frame member in driving engagement with said drive gear, and means to reciprocate said rack means.

3. The press set forth in claim 2, wherein said rack means comprises diametrically opposed racks in driving engagement with said drive gear, and said rack reciprocating means comprises a pair of fluid powered pistons, each piston being secured to an end of each of said racks and being synchronized to move said racks in equal and opposite directions.

4. The improvement in industrial presses comprising: a plurality of press units aligned side by side to provide a continuous die bed from press unit to press unit, each press unit including a plurality of frame members aligned side by side and spaced apart one from another; a plurality of slide members interleaved between said frame members; a drive shaft extending through and journaled in said frame members of each press unit; a plurality of eccentrics co-planar with said slide members and secured to said drive shaft and means to selectively connect the drive shafts of said plurality of press units, whereby said press may be driven from either or both sides, and/or selected units may be rendered non-operative.

5. The improvement in industrial presses comprising: a plurality of frame members aligned side by side; a plurality of slide members, interleaved between said frame members for reciprocating movement therebetween; co-planar eccentric drive means mounted in said slide members; and a drive shaft interconnecting said eccentric drive means to coordinate the movement of said eccentric drive means.

6. The improvement in an industrial press comprising: a plurality of substantially identical one piece C-shaped frame members, the lower portions of said frame members forming in combination the die bed of said press; a plurality of substantially identical one piece slide members interleaved between said frame members; and eccentric drive means mounted in said slide members co-planar therewith.

7. The improvement in an industrial press comprising: a plurality of substantially identical one piece O-shaped frame members, the lower portions of said frame members forming in combination the die bed of said press; a plurality of substantially identical one piece slide members interleaved between said frame members; and eccentric drive means mounted in said slide members co-planar therewith.

References Cited in the file of this patent

UNITED STATES PATENTS

| 750,313 | Shipway | Jan. 26, 1904 |
| 947,233 | Hammond | Jan. 25, 1910 |
| 1,373,571 | Smith | Apr. 5, 1921 |
| 1,867,981 | Mudd | July 19, 1932 |
| 1,974,148 | Byerlein | Sept. 18, 1934 |
| 2,288,963 | Von Tavel | July 7, 1942 |
| 2,416,058 | Mangnall | Feb. 18, 1947 |
| 2,493,679 | Markey | Jan. 3, 1950 |

FOREIGN PATENTS

| 430,999 | Great Britain | June 28, 1935 |
| 470,773 | France | Sept. 29, 1914 |

UNITED STATES PATENT OFFICE
CERTIFICATE OF CORRECTION

Patent No. 2,860,571

November 18, 1958

Meredith R. Hatch

It is hereby certified that error appears in the printed specification of the above numbered patent requiring correction and that the said Letters Patent should read as corrected below.

Column 4, line 63, for "190°" read -- 180° --.

Signed and sealed this 14th day of April 1959.

(SEAL)
Attest:

KARL H. AXLINE
Attesting Officer

ROBERT C. WATSON
Commissioner of Patents